United States Patent [19]
Underhill et al.

[11] Patent Number: 5,300,347
[45] Date of Patent: Apr. 5, 1994

[54] EMBOSSED FACIAL TISSUE

[75] Inventors: Kimberly K. Underhill; Mark A. Burazin, both of Appleton, Wis.

[73] Assignee: Kimberly-Clark Corporation, Neenah, Wis.

[21] Appl. No.: 841,952

[22] Filed: Feb. 26, 1992

Related U.S. Application Data

[63] Continuation-in-part of Ser. No. 662,888, Mar. 1, 1991, and a continuation-in-part of Ser. No. 771,966, Oct. 2, 1991, abandoned, and a continuation-in-part of Ser. No. 773,397, Oct. 2, 1991, Pat. No. D. 331,665.

[51] Int. Cl.⁵ .......................... B31F 1/07; D21H 27/02
[52] U.S. Cl. ..................................... 428/171; 162/117; 162/223; 428/187; D5/53
[58] Field of Search ................. 428/171, 187; 162/117, 162/223

[56] References Cited

U.S. PATENT DOCUMENTS

| | | | |
|---|---|---|---|
| 2,464,301 | 3/1949 | Francis | 428/171 |
| 4,493,868 | 1/1985 | Meitner | 428/171 |
| 4,659,608 | 4/1987 | Schulz | 428/187 |
| 4,670,317 | 6/1987 | Greenway | 428/187 |
| 4,921,034 | 5/1990 | Burgess et al. | 428/171 |

FOREIGN PATENT DOCUMENTS

| | | |
|---|---|---|
| 305014 | 12/1972 | Australia . |
| 0265298 | 4/1988 | European Pat. Off. . |
| 349939 | 5/1931 | United Kingdom . |

OTHER PUBLICATIONS

*Discover*, Feb., 1990 pp. 4, 69-72, 75, 76 and 78.

Primary Examiner—James C. Cannon
Attorney, Agent, or Firm—G. E. Croft

[57] ABSTRACT

Uniformly embossed facial tissue having a continuous or closely-spaced discontinuous embossing pattern and having from about 1 to about 40 distinct individual unembossed areas per square inch of tissue is considered to be a consumer-preferred facial tissue. In addition, the embossing intensity (as determined by the Shadow Index defined herein) is preferably within the range of from about 3 to about 25.

23 Claims, 7 Drawing Sheets

EMBOSSED FACIAL TISSUE

This application is a continuation-in-part of co-pending application Ser. No. 07/662,888 filed Mar. 1, 1991 in the name of Mark Alan Burazin and entitled "Embossed Tissue or Similar Article", co-pending application Ser. No. 07/771,966 filed Oct. 2, 1991 in the name of Kimberly K. Underhill and entitled "Embossed Tissue or Similar Article", now abandoned, and co-pending application Ser. No. 07/773,397 filed Oct. 2, 1991 in the name of Kimberly K. Underhill and entitled "Embossed Tissue or Similar Article", now Design Pat. No. D331,665.

BACKGROUND OF THE INVENTION

In the manufacture of facial tissues, the trend over the years has been to make facial tissues softer and smoother. Unlike other creped tissue products such as bath tissue, paper towels and dinner napkins, which have traditionally been embossed to provide greater bulk and aesthetics, commercially available facial tissues have historically remained unaltered from their basesheets, with the exception of being crimped along their edges to hold multiple plies together. It has long been accepted that consumers desire a flat, smooth product. An exception to this trend has been a recently introduced commercially available embossed facial tissue manufactured by Scott Paper Company under the trademark Scotties ®. However, the embossing in this product is a very lightly embossed discontinuous floral pattern, somewhat similar to patterns typically considered for bath tissue.

SUMMARY OF THE INVENTION

It has now been discovered that in order to provide a consumer preferred embossed facial tissue, the embossing pattern must be of a particular nature and preferably of an intensity which is different than those typically used for related products such as paper towels or bath tissue. More specifically, the facial tissue embossing pattern must have a substantially uniform overall spacing of a relatively large number of embossed pillows. In addition, the depth or intensity of embossing is preferably within a certain range, above which or below which is not as desirable. The embossing intensity is quantified by a light reflection test and is expressed as the Shadow Index (hereinafter described).

Hence in one aspect the invention resides in an embossed facial tissue having from about 1 to about 40 distinct individual unembossed areas (pillows) in each square inch of the embossed surface of the tissue. More specifically, the number of pillows per square inch is from about 2 or 3 to about 10, still more specifically from about 4 to about 7.

In another aspect, the invention resides in an embossed facial tissue having a Shadow Index of from about 3 to about 25, more specifically from about 5 to about 20, and still more specifically from about 5 to about 10.

In a further aspect, the invention resides in an embossed facial tissue having from about 1 to about 40 distinct individual unembossed areas in each square inch of the embossed surface of the tissue and a Shadow Index of from about 3 to about 25.

Because the uniformity of facial tissue embossing is considered important for consumer preference, it is preferred that the standard deviation of the Shadow Index determination be about 2 or less and more preferably about 1 or less. For the same reason, it is also preferred that the coefficient of variation for the average number of pillows per square inch be about 1 or less.

For purposes herein, a facial tissue is a tissue product which is sold for use as a facial tissue and is packaged and labelled for facial tissue use. Facial tissues are generally characterized by two or more sheets or plies made with papermaking fibers, such as hardwood and/or softwood fibers; a basis weight per ply of from about 5 to about 15 pounds per 2880 square feet; the individual plies are normally creped; the product has a wet strength of at least about 120 grams per inch; the plies are generally crimped along their edges to maintain the plies together during use; the product is generally square or rectangular, having an area of from about 60 to about 100 square inches, more preferably about 80 square inches; and the product is generally folded one or more times and dispensed one at a time from a carton or wrapper.

As referred to above, a "pillow" or a "distinct individual unembossed area" is an unembossed area of the facial tissue which is completely or substantially completely surrounded or defined by lines of embossing. The lines of embossing compress the sheet, leaving the unembossed pillow areas of the sheet surrounded by the lines of embossing relatively bulky. The average area of these pillows is preferably within a range of from about 0.05 to about 0.2 square inch per pillow and, more specifically, from about 0.05 to about 0.1 square inch per pillow. Multiple sizes of pillows within the same embossing pattern are within the scope of this invention, although it is preferred that the pillow sizes be relatively uniform.

The embossing patterns which are preferred for facial tissues are those which can be classified as "continuous" patterns as opposed to "distinct element" patterns. Continuous patterns are characterized by an unbroken line of embossing which can be traced throughout the embossing pattern. Geometric patterns which have individual unembossed areas bounded by straight lines, for example, lend themselves to being continuous patterns. Examples of suitable geometric unembossed areas include rhomboid, rectangular, and square shapes. On the other hand, distinct element patterns do not exhibit an unbroken line of embossing which can traced throughout the embossing pattern. Instead, distinct element patterns consist of an array of compressed dots (which are not "unembossed areas"), flowers, or other distinct shapes which are relatively widely spaced apart and not connected. The average spacing of any unembossed elements of distinct element embossing patterns is typically about 0.5 inch or greater. Such embossing patterns are commonly found in commercially available bath tissues and household paper towels.

Notwithstanding the foregoing, "closely-spaced" distinct element patterns which give the overall appearance of a continuous pattern are also preferred for facial tissue. Closely-spaced distinct element embossing patterns are characterized by the distinct individual unembossed areas being separated by an average distance of about 0.1 inch or less, preferably about 0.05 inch or less. The distinctions among "continuous", "distinct element" and "closely-spaced distinct element" embossing patterns will be further discussed in connection with the drawing.

DETAILED DESCRIPTION OF THE DRAWING

Figure 1:
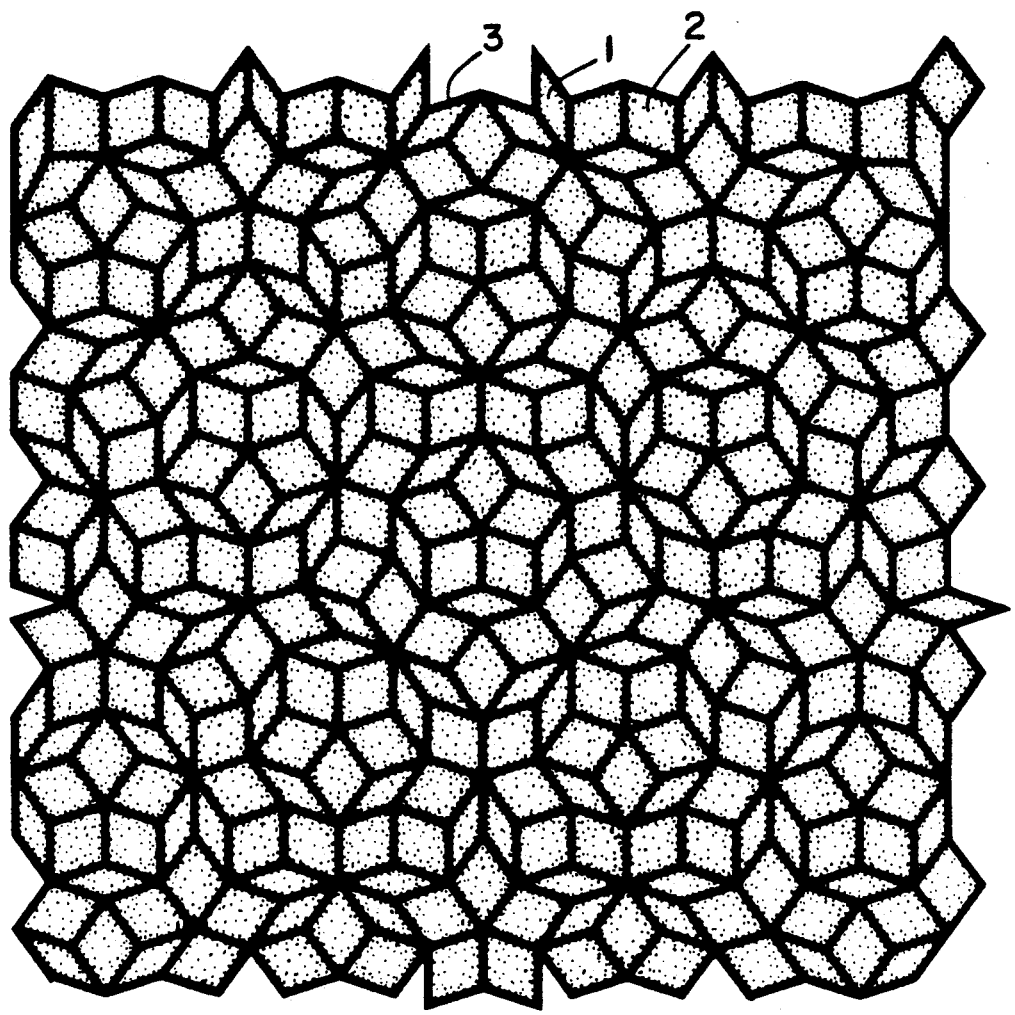
FIG. 1 is a plan view of an embossed facial tissue, actual size, having a continuous embossing pattern in accordance with this invention.

Referring to the Drawing, the invention will be described in greater detail. FIGS. 1-6 are directed toward illustrating and understanding the nature of the embossing patterns which form a part of this invention. FIG. 7 illustrates the apparatus for determining the Shadow Index, and this aspect of this invention pertaining to the intensity of the embossing pattern will be described in connection therewith.

Directing attention to FIG. 1, shown is an embossed facial tissue having an embossing pattern within the scope of this invention. This embossing pattern essentially consists of two different rhomboid (diamond) shaped pillows 1 and 2 arranged in a geometric pattern closely approximating the pattern commonly referred to as the "Penrose" pattern, named after the mathematician, Roger Penrose, who devised the pattern. Whereas the true Penrose pattern is infinite and never repeats itself, the embossing pattern illustrated in FIG. 1 differs slightly in that it does repeat in order to avoid the formation of an unmatched seam when engraved onto an embossing roll. The overall appearance, however, is the same as that of the Penrose pattern. Note that the embossing line 3 is continuous and can be traced throughout the embossing pattern. This is the characteristic of a "continuous" embossing pattern. Each of the unembossed areas completely surrounded or defined by the embossing line is referred to herein as a "discrete individual unembossed area" or "pillow". For this particular pattern, the area of the smaller of the two pillow shapes is about 0.07 square inch and the area of the larger of the two pillow shapes is about 0.09 square inch. The thickness of the embossing line between pillows is 0.05 inch. The average number of pillows per square inch of embossed tissue area is 5.6. The minimum number of complete pillows in each square inch of embossed tissue area is 4 or greater.

Figure 2:
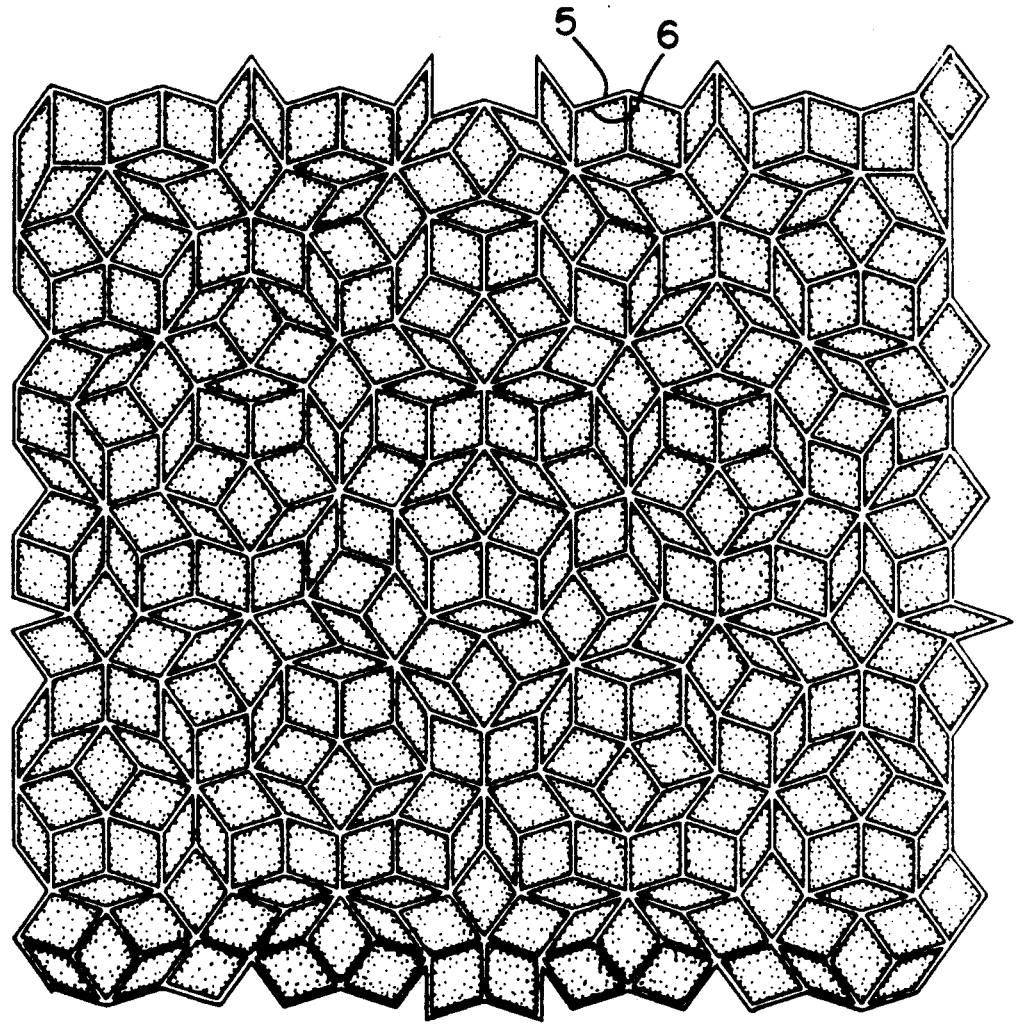
FIG. 2 is a plan view of an embossed facial tissue having a closely-space discrete element embossing pattern, very similar to that shown in FIG. 1, also within the scope of this invention.

FIG. 2 is a facial tissue also within the scope of this invention having an embossing pattern very similar to that shown in FIG. 1, except the lines of embossing are split into two thin parallel lines 5 and 6 rather than one thick line. The sizes and shapes of the pillows and the average number of pillows per square inch is the same as that described in FIG. 1. This embossing pattern is disclosed and claimed in co-pending parent application Ser. No. 07/662,888, filed Mar. 1, 1991, referred to above. The effect of the twin embossing lines is to change the embossing pattern from a "continuous" pattern to a "closely-spaced distinct element" pattern. Note each of the diamond-shaped unembossed areas are completely enclosed by four thin lines of embossing to define a distinct pillow. The thickness of each of the twin embossing lines is about 0.015 inch and the distance between the twin embossing lines is about 0.03 inch.

Figure 3:
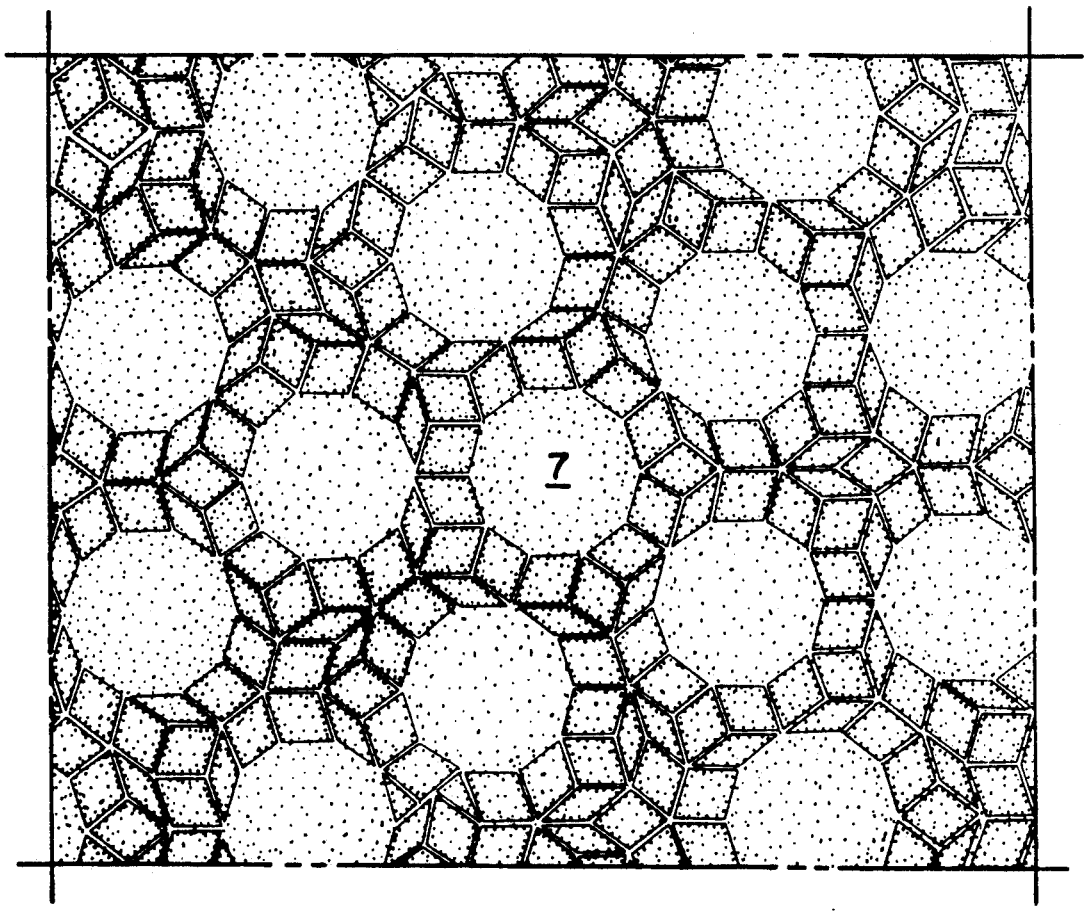
FIG. 3 is a plan view of an embossed facial tissue, actual size, having another closely-spaced discrete element embossing pattern within the scope of this invention.

FIG. 3 shows an embossed facial tissue within the scope of this invention in which the embossing pattern is a closely-spaced discrete element pattern similar to that of FIG. 2, but in which relatively large open areas 7 are left unembossed for visual effect. Note that for purposes herein, the large open areas are not discrete individual unembossed areas or pillows because they are not completely enclosed by lines of embossing. Instead, they are part of the unembossed matrix or continuum that separates the distinct individual pillows from each other. Hence the only pillows in this embossing pattern are those formed in either of the two diamond shapes. For this particular pattern, the area and spacing of the diamond-shaped pillows is the same as those of FIGS. 1 and 2. The average number of pillows per square inch of embossed area is 5.3. The minimum number of pillows in each square inch of embossed facial tissue area is 2 or greater.

Figure 4:
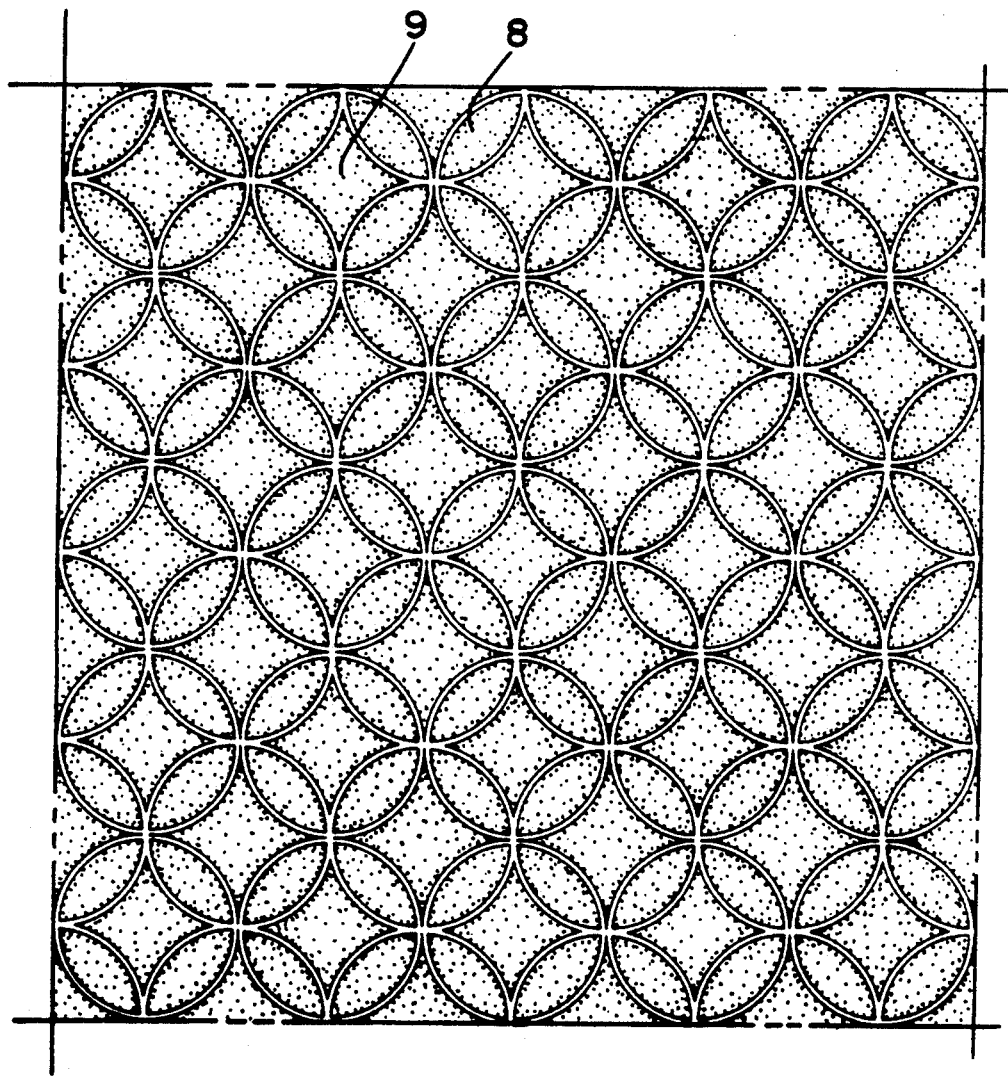
FIG. 4 is a plan view of an embossed facial tissue, actual size, having another closely-spaced discrete element embossing pattern within the scope of this invention.

FIG. 4 is a facial tissue having another closely-spaced discrete element embossing pattern within the scope of this invention. In this pattern the pillows are of two shapes, one being a pointed oval 8 and the other being a star 9. Similar to FIGS. 2 and 3, the embossing lines are twin embossing lines having a thickness of about 0.01 inch and a spacing of about 0.06 inch. The area of the pointed oval pillows is about 0.25 square inch and the area of the star pillows is about 0.5 square inch. The average number of pillows per square inch of embossed tissue area is 2.6 and the minimum number of pillows in each square inch of embossed tissue area is 1 or greater.

Figure 5:
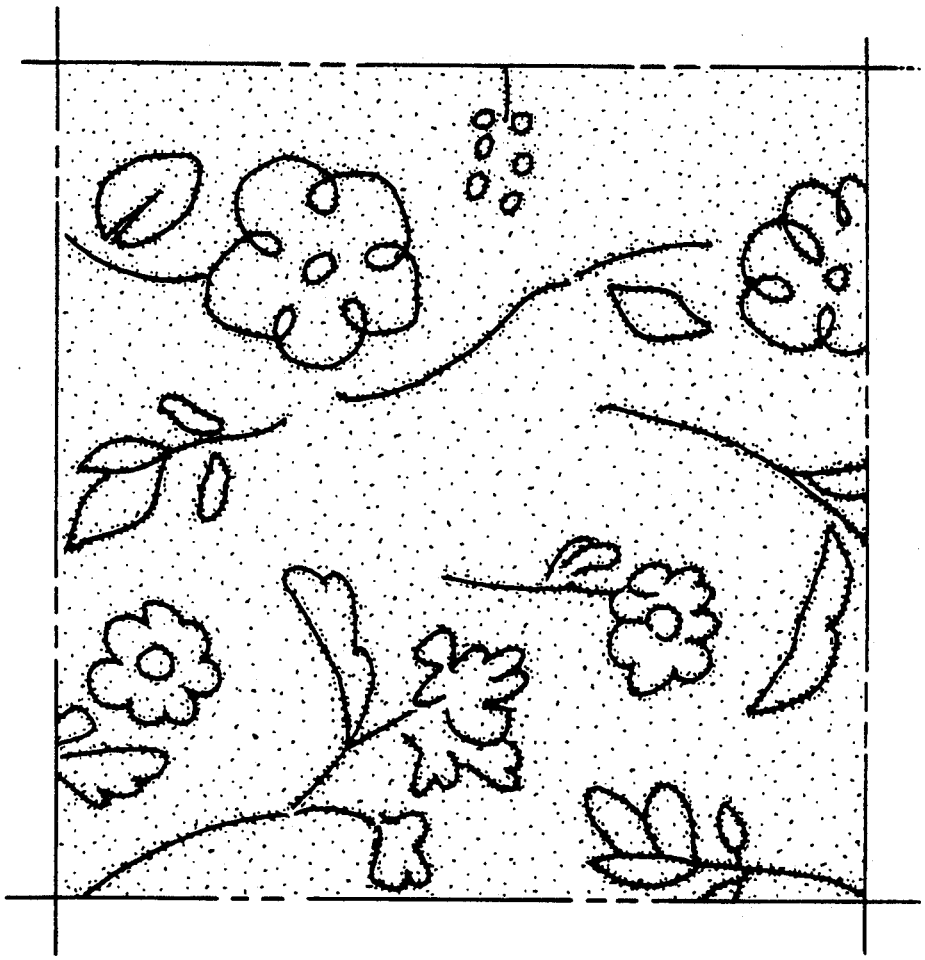
FIG. 5 is a plan view of a commercial facial tissue having a discrete embossing pattern not within the scope of this invention.

FIG. 5 is an embossed facial tissue currently being marketed under the trademark Scotties ® and is not within the scope of this invention. The embossing pattern of this tissue is a typical distinct element pattern in which the elements are not closely-spaced. The intensity of the embossing, as measured by the Shadow Index, is about 12 with a standard deviation of about 3. The number of pillows per square inch of embossed tissue area is about 0.5. The minimum number of pillows in each square inch of embossed tissue area is 0 or greater.

Figure 6:
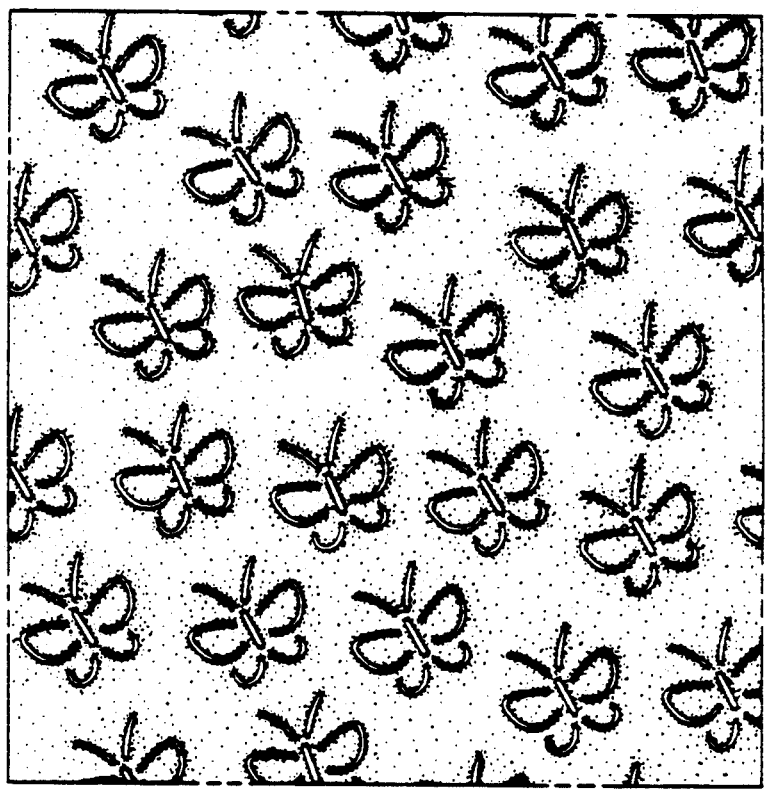
FIG. 6 is a plan view of an embossed facial tissue having a discontinuous embossing pattern not within the scope of this invention.
Figure 7:
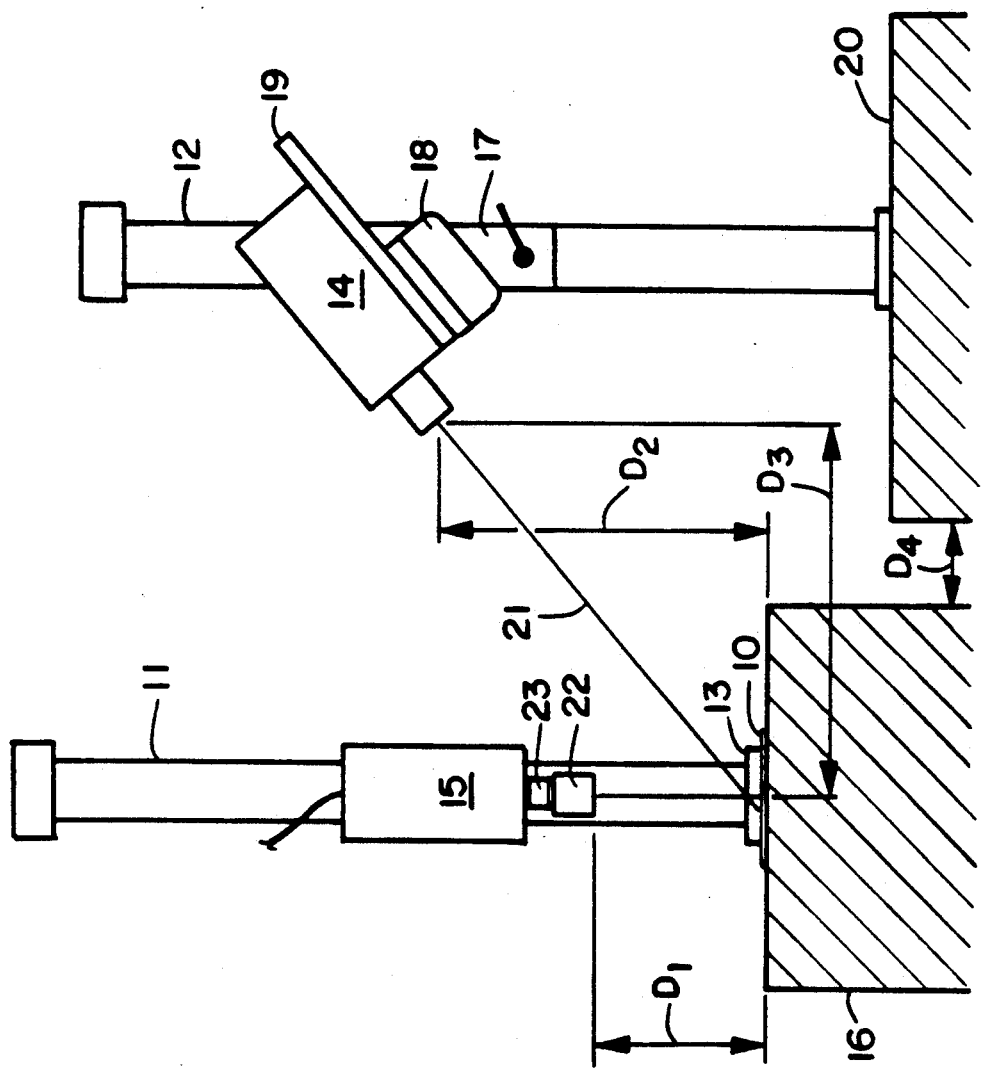
FIG. 7 is a schematic view of the apparatus and set-up for determining the Shadow Index.

FIG. 6 is an embossed facial tissue having a butterfly embossing pattern, which is a typical distinct element embossing pattern and is not within the scope of this invention. In this pattern, all of the embossing lines defining the butterflies are solid (not twin lines). As a result of the particular manner in which the embossing lines depict the butterflies, there are no "pillows" in this pattern as the term is used herein, since no area within each butterfly is completely enclosed.

Attention is now directed to another aspect of this invention, namely the intensity of embossing as measured by the Shadow Index. It has been found that embossing intensities, regardless of the pattern, can be an important aspect of a consumer acceptable product.

Embossing which is either light or heavy is not preferred. This is somewhat unexpected in that heavy embossing is generally preferred for bath tissue and paper towels. At the other end of the spectrum, light embossing might be expected to be more preferable for facial tissue since facial tissues are traditionally smooth. However it has been found that this is not the case. Instead, an intermediate range of embossing intensity is preferred, in which the embossing pattern can be distinctly detected yet is not harsh in appearance and feel. The intensity of the embossing can be measured and is expressed herein as the Shadow Index.

The Shadow Index is designed to mimic human visual perception of the texture of a surface. A human observer infers the texture of a surface from the varying illumination levels created by partial shadowing of that surface when it is illuminated with reflected light. Texture is most noticeable to a human observer when the surface is illuminated with light from an oblique angle. The Shadow Index is an instrumental implementation of this process whereby an image analyzer is used to measure the shadow area percentage of a surface illuminated by light at an oblique angle.

Referring to FIG. 7, the apparatus and method for determining the "Shadow Index" will be described in detail. The method involves the testing of a 4"×4" embossed tissue sample 10, so that the female side of the embossed tissue is facing up. The sample is placed with the machine direction running perpendicular to a horizontal line connecting columns 11 and 12. A 4"×4"×¼" cover glass 13 weighing 62.94 grams (regular single-strength window glass) is carefully placed over the sample. The cover glass is cleaned before each use and handled by the edges to avoid fingerprints. The tissue sample should lay flat with no folds or wrinkles in the area of analysis. (Folds or wrinkles will produce a shadow and generate erroneous data.) With all of the room lights off, the tissue sample is illuminated with a slide projector 14 so that the shadow cast by the embossing pattern is generated from the cross direction of the tissue. The resulting image of the sheet, with shadows from embossing superimposed, is detected by a TV camera 15. The detected image is then processed by an image analysis system (not shown) to yield a "Shadow Index" number, which is the area percentage of the shadow generated by the embossing on the tissue. Additional data which can be generated includes mean grey level, coefficient of variation, and the 95 percentile of the grey level distribution ratioed for the mean grey level.

The TV camera 15 is a Dage Model 68 Series MKII with the CCIR synchronization and timing option (commonly called PAL format). The TV camera is equipped with a Newvicon sensing tube to provide a unity system gamma. The camera is equipped with the optional remote control feature that allows external adjustment of gain and black level via 10 turn potentiometers. The TV camera is mounted on a Polaroid model 44-01 MP-4 standard fixed column 11. The column is attached to a Kreonite mobile studio 16, model MS36-MP4, for Polaroid MP-4 camera systems. The mobile studio is available from Kreonite, Inc., 715 E. 10th St., P.O. Box 2099, Wichita, Kans. 67201. The Polaroid MP-4 column is available from Polaroid Resource Center, 784 Memorial Dr. 3M, Cambridge, Mass. 02139.

The working distance $D_1$ between the tissue sample and the bottom of the TV camera lens is adjusted to be about 13 9/16".

The tissue sample is illuminated by a Kodak Ektagraphic slide projector 14, model B-2, using a 300-watt beam at infinity focus. The slide projector is supported by a second Polaroid model 44-01 MP-4 standard fixed column 12. The carriage assembly 17 supplied with the MP-4 column is equipped with the supplied camera body 18. The camera body is modified by the addition of a shelf, 19, made of ¾" plywood. The slide projector is placed on this shelf. The MP-4 column 12 is attached to a separate table 20 positioned a distance $D_4$ of about 6" from the mobile studio 16.

The slide projector is connected to a variable autotransformer type 3PN1010 available from Staco Energy Products Co., 301 Goddis Blvd., Dayton, Ohio 45403. Said autotransformer is used to adjust the projector illumination level. The position of the slide projector is adjusted so that the vertical distance, $D_2$, from the center of the projector lens to the plane defined by the top of the mobile studio 16 is 26⅜". The horizontal distance, $D_3$, between the center of the projector lens and the plane defined by the center of the camera lens, the center of the sample and the center of column is adjusted to be 32⅝". Given these distance adjustments, the center of the projection beam 21 makes a 39° angle with respect to horizontal.

A Nikkor 35 mm f/1.2 lens, 22, is connected to the camera via an F-to-C adapter 23. The lens and adapter are available from Nikon Instruments, OEM Sales Group, Garden City, N.Y. The lens aperture is set to f/11, but other aperture settings can be used.

The image analysis system used to generate the data presented herein was the Zeiss/Kontron IBAS.

Adjustment of Gain and Black Level

The camera is operated in the manual gain and black level mode. The gain and black level must be set via the following procedure for proper measurement of the Shadow Index:

1) Connect the Dage 68 camera to the Zeiss IBAS.

2) Place a Nikkor f/1.2, 35 mm lens on the camera by utilizing an "F" to "C" adaptor with no additional extension tubes. Set the f-stop to an intermediate value. Do not change f-stop setting for the rest of this procedure.

3) Mount the camera on a fixed pedestal above a Lambertian illumination source so that the camera is centered over said source and views said source at a normal angle. Said illumination source should have manually adjustable intensity, minimum shading, and should have illumination area larger than the camera field of view size with the mounted optics.

4) Set the IBAS for a PAL mode, set the frame size for 768 (horizontal)×512 (vertical) pixels and insert a repetitive program that will allow continuous readout of field average grey level. (See below for one such program.)

5) Set the camera to focus on the illumination source.

6) Set the camera gain to a given level. Lock control; it should not be changed for rest of this procedure. Generally, it is recommended that low gain settings be used to eliminate signal noise.

7) Set some value of black level and temporarily lock control. It is recommended that the black level be set so that capped lens grey values read about 10.

8) Uncap the camera lens so that the camera can "see" the illumination source. Using a spot photometer that displays illumination measurements in units of candela / square meter or Watts / square meter or any unit that can be converted to units of power / area or luminous flux / area, generate a data set containing system grey level output at various illumination levels. The spot photometer should view the illumination source at the center of the camera field of view, at a 90 degree angle. Illumination values should be approximately evenly distributed in a range between:
   a) A lower value where camera output no longer changes significantly with light changes; and
   b) An upper value corresponding to a system output of grey level 255.
The data set should consist of a minimum of 10 response pairs.

9) Fit the data from Step 8 to a linear regression with the illumination values as the independent variable. If the camera is equipped with a properly functioning Newvicon sensing tube, the regression should yield an $r^2$ value of at least 0.98. If the $r^2$ value is less than this, the camera should be serviced before continuing. If the $r^2$ value is within specification, note the "Y axis" intercept.

10) Using the black level control, suppress the black level to lower the effective intercept to a value of $-139$ grey levels. In order to accomplish Step 10, the user must know the relationship between black level setting and grey level suppression. This is easily determined by capping the camera lens and measuring grey level response at various black level settings above the camera blanking level. A properly functioning Dage 68 camera should show a linear relationship between black level setting and grey level. Therefore, the slope coefficient resulting from a linear regression fitted to the black level response data can be used to gauge the amount of grey level suppression per black level unit. If the coefficient of determination ($r^2$) is below about 0.97, based on about 10 points, there is evidence that the camera response to black level adjustment is not linear and that the camera needs service.

11) The illumination source is now set so that the camera/Zeiss IBAS system outputs a grey level of about 250. A dark mask is partially inserted over the light source so that the camera displays a definite sharp pattern. The edge of the light to dark transition is studied for any evidence of blooming or camera clipping. If either characteristic is noted, the camera requires servicing before testing can begin. (Blooming is usually caused by insufficient camera beam current while clipping is usually caused by the video amplifier circuitry. Adjustments to these camera parameters must only be made by trained service personnel because any such adjustments can affect camera geometrical distortion and phase response values.)

Example of Camera Adjustment

The Dage 68 camera with optional remote control assembly attached, is mounted on the Polaroid MP-4 macroviewer stand and connected to the Zeiss IBAS. The Nikkor f/1.2, 35 mm lens is placed on the camera utilizing an "F" to "C" adaptor with no extension tubes. The f-stop of the lens is set to f/16. A ChromoPro 45 illumination source with the optional 8" by 10" diffuser assembly (available from Byers Photo Equipment Company, Portland, Oreg., part numbers 01-21408-01 and 01-07271) is centered under the camera so that the camera views the diffuser at a 90 degree angle. The camera gain control is set for 2.50 (on a range of 0 to 10) and locked. The camera is next focused on an area of the diffuser extending about 5" horizontally and 4" vertically. Then, the camera lens is capped. The camera is powered up and left to stabilize for four hours. The Zeiss IBAS is powered up in PAL mode and set to function with the following program:

```
resetpar
setframe "F768"
tvinp 1
clearall 0
clearallov
stats[100]:=0.0
loadlut "tvonline"
for i=0, i<18, i=i+1
write
endfor

tvon
while(1)
tvinp 1
display 1
measgrst 1,0,"stats","*"
result=stats[6]
write result
endwhile
stop
```

The Zeiss program is started after the 4 hour camera stabilization. The effect of the black level control on system grey level is measured by varying the black level control setting above the value where camera blanking precludes the control from affecting system grey level output. The following data is generated:

| Black Level Setting | Zeiss Grey Level |
|---|---|
| 6.00 | 25 |
| 6.25 | 48 |
| 6.50 | 75 |
| 6.75 | 102 |
| 7.00 | 124 |
| 7.25 | 147 |
| 7.50 | 170 |
| 7.75 | 195 |
| 8.00 | 222 |

A linear regression fitted to the data yields an $r^2$ of 0.999 indicating proper camera black level response. The resulting regression equation is:

$$(\text{grey level}) = 97.6 * (\text{black level setting}) - 560.1$$

The black level is now set to 5.85 so that the system capped lens response is about at grey level 10. Next system illumination response data is generated by uncapping the lens and varying the ChromoPro voltage to change illumination levels. The actual ChromoPro illumination is measured with a Minolta Spot Meter F (available from Minolta Camera Co., Ltd., Ramsey, N.J.) set for a film speed of ISO 100 and set for the "Exposure Value" display. The Exposure Value output is converted to arbitrary units of luminous flux per area by the following formula:

$$\text{Illumination} = 2^{(\text{Exposure Value})}$$

The ChromoPro voltage is carefully adjusted so that the illumination values shown in the following table are measured. Using the still-running IBAS program, the resulting grey levels are also recorded as shown below:

| Illumination ($2^{(EV)}$ units) | System grey level |
|---|---|
| 55.7 | 20.6 |
| 157.6 | 41.7 |
| 274.4 | 62.9 |
| 388.0 | 85.3 |
| 477.7 | 100.9 |
| 588.1 | 116.9 |
| 675.6 | 137.8 |
| 891.4 | 169.2 |
| 1024 | 198.9 |
| 1260.7 | 229.0 |

A linear regression fitted to this data yields (with an $r^2$ of 0.997)

(grey level) = 0.1745 * (illumination) + 15.2

The equation states that the intercept value is 15.2. As per the description above, the desired intercept is −139.0. To achieve this value, the existing black level must be suppressed by (−139.0−15.2)=154.2. From the first regression of this example, the black level control will suppress 97.6 grey levels per unit. To get a 154.2 grey level suppression requires a change of (154.2 / 97.6)=1.58 in the black level setting. The current value of black level is 5.85. Subtracting 1.58 gives the value for black level for embossing intensity analysis. This value is 4.27. The black level control is set to this value and locked.

The camera is now checked for blooming by raising the ChromoPro illumination until the mean field grey level is at a value of 250 (measured by the IBAS program shown above.) A piece of black construction paper with a clean, sharp edge is placed on the Chromo-Pro diffuser so that approximately 10 percent of the field of view is black. The edge between the bright and dark image regions is carefully studied on the IBAS monitor. The border is found to be sharp, indicating that the camera does not have a blooming problem. (If the camera did have a blooming problem, the border would blur.) The camera is finally mounted to the test apparatus as described above and testing proceeds.

The following interpreter program is loaded into the Zeiss for analysis:

```
# Zeiss Program SHADOW

# This program is a trial for measuring the overall embossing
pattern
# intensity on product. It uses the following method:

# This program uses the Dage 68 camera with reflected
illumination.
# A slide projector is mounted on the column located next to
the mobile studio.
# The height reference of 115.0 is measured at the bottom of
the carriage scale.
# The 35 mm lens at f/11 was used with a camera height
reference of 56.0
# measured at the bottom of the carriage scale. The sample
was covered
# with a 4" X 4" piece of regular glass. The gain and the
offset must be set
# manually. Adjust the camera gain to minimum or 0.00 on the
dial indicator.
# Adjust the camera black to 4.50 on the dial indicator.

setframe "F512"
clearall 0
resetpar
clearallov
ovcolour 5 # Set for red overlay
InitField AREAP,TOTALAREA
scalgeom 1,"1:1-scale",_OFF,_OFF # Chooses pixel scale for
areap
stats[100]: = 0.0
histo[256]: = 0
a = 10
b = 512-(2*a)
sampname = "      "
loadlut "tvonline"
scrolbox 18

while(1)
write "Enter the name of the specimen."
write
beep 100,1000
read sampname
scrolbox 6
while(1)
loadlut "tvonline"
tvon
write "Load specimen ",sampname," Focus. "
write
beep 100,1000
pause
scrolbox 6
tvinp 1
display 1
measgrst 1,0,"stats","*"
result = stats[6]
if(result > 180 && result < 190) : break
beep 500,1000
write "Illumination outside of allowable range. Currently
",result
write "need 180-190."
write
endwhile
tvaver 1,12,10,10
lowpass 1,2,50,50,1
shaddef 2,11
shadcorr 1,1,11,_OFF,0
lowpass 1,2,a,a,1
display 2
loadlut "grey"
drawframe 3,3,a,a,b,b,_OFF
ovlgrey 3,3,3,255
clearallov
display 3
fill 3,3
multiply 2,3,4,255
display 4
loadlut "tvonline"
scalim 4,5,120,240,0,255,0,255,3
display 5
measgrst 5,−1,"stats","histo"
intmin = int(stats[5])

intmin = intmin + 30
dis2lev 5,6,0,intmin,_ON,_OFF,1
display 6
notim 6,7
display 7
identify 7,8,_ON,_ON
display 8
measfield 8,"datafile",_OFF
AREAP = AREAP*512/b*512/b

sum = per80 = per85 = per90 = per95 = 0
i = 1
while (sum < 0.80 * stats[20])
sum = sum + histo[i]
i = i + 1
endwhile
per80 = (i − 1)
while (sum < 0.85 * stats[20])
sum = sum + histo[i]
i = i + 1
```

-continued

```
endwhile
per85 = (i − 1)
while (sum < 0.90 * stats[20])
sum = sum + histo[i]
i = i + 1
endwhile
per90 = (i − 1)
while (sum < 0.95 * stats[20])
sum = sum + histo[i]
i = i + 1
endwhile
per95 = (i − 1)
per80f = per80 / stats[6]  # These are floating point values
as an integer/
per85f = per85 / stats[6]  # floating point yield a floating
point
per90f = per90 / stats[6]
per95f = per95 / stats[6]
coov = stats[7] / stats[6]
fwrite "PRN","For specimen ",sampname
fwrite "PRN","The Shadow Index is ",AREAP
fwrite "PRN","The mean GL is ",stats[6]
fwrite "PRN","The coefficient of variation is ",coov
fwrite "PRN","The 95 percentile ratioed for the mean GL is
",per95f
fwrite "PRN"
fwrite "PRN"
fwrite "PRN"

write "Do you wish to test another specimen (0 = NO, 1 =
YES)."
write
beep 100,1000
ans = 1
read ans
if (not(ans)) : break
endwhile

write "Dump the data from the printer by switching off-line
and pressing"
write "the form feed button."
write
beep 1000,1000
beep 100,1000
beep 200,800
beep 400,600
stop
```

Sample Testing

Samples are tested using the following procedure:
1. Set up the apparatus as discussed above.
2. Power up all equipment.
3. Load the "Shadow" program, disclosed above, into the IBAS.
4. Start the IBAS program. Obey program instructions displayed on the message screen of the IBAS in regards to:
   a. Entering the name of the specimen;
   b. Loading the specimen;
   c. Setting the projector illumination by use of the autotransformer (Illumination must be within the acceptable range or program will not allow user to continue).

It will be appreciated that the foregoing description and examples, given for purposes of illustration, are not to be construed as limiting the scope of this invention, which is defined by the following claims and all equivalents thereto.

We claim:

1. An embossed facial tissue having an average of from about 1 to about 40 distinct individual unembossed areas per square inch of embossed surface of the tissue, said unembossed areas being provided by an embossing roll having a seamless simulated Penrose embossing pattern.

2. The embossed facial tissue of claim 1 wherein the distinct individual unembossed areas collectively form a continuous embossing pattern.

3. The embossed facial tissue of claim 1 wherein the distinct individual unembossed areas collectively form a closely-spaced discontinuous embossing pattern.

4. The embossed facial tissue of claim 3 wherein the average distance between the distinct individual unembossed areas is about 0.1 inch or less.

5. The embossed facial tissue of claim 3 wherein the average distance between the distinct individual unembossed areas is from about 0.01 to about 0.05 inch.

6. The embossed facial tissue of claim 3 wherein the average distance between the distinct individual unembossed areas is about 0.03 inch.

7. The embossed facial tissue of claim 2 or 3 wherein the distinct individual unembossed areas are rhomboid in shape.

8. The embossed facial tissue of claim 1 wherein the distinct individual unembossed areas have an area of from about 0.05 to about 0.20 square inch.

9. The embossed facial tissue of claim 1 wherein the distinct individual unembossed areas have an area of from about 0.05 to about 0.1 square inch.

10. The embossed facial tissue of claim 1 wherein the average number of distinct individual unembossed areas is from about 2 to about 10 per square inch of embossed surface of the tissue.

11. The embossed facial tissue of claim 1 wherein the average number of distinct individual unembossed areas is from about 4 to about 7 per square inch of embossed surface of the tissue.

12. An embossed facial tissue having a continuous embossing pattern having an average of from about 2 to about 10 distinct individual unembossed areas per square inch of embossed surface of the tissue with a coefficient of variation of about 1 or less, said unembossed areas being provided by an embossing roll having a seamless simulated Penrose embossing pattern.

13. The embossed facial tissue of claim 12 wherein the distinct individual unembossed areas have an area of from about 0.05 to about 0.2 square inch.

14. The embossed facial tissue of claim 13 wherein the distinct individual unembossed areas are rhomboid in shape.

15. An embossed facial tissue having a closely-spaced distinct element embossing pattern having an average of from about 2 to about 10 distinct individual unembossed areas per inch of embossed surface of the tissue with a coefficient of variation of about 1 or less, said unembossed areas being provided by an embossing roll having a seamless simulated Penrose embossing pattern.

16. The embossed facial tissue of claim 15 wherein said distinct individual unembossed areas have an area of from about 0.05 to about 0.2 square inch.

17. The embossed facial tissue of claim 1, 12 or 15 having a Shadow Index of from about 3 to about 25.

18. The embossed facial tissue of claim 1, 12 or 15 having a Shadow Index of from about 5 to about 20.

19. The embossed facial tissue of claim 1, 12 or 15 having a Shadow Index of from about 5 to about 10.

20. An embossed facial tissue having a Shadow Index of from about 3 to about 25 with a standard deviation of about 2 or less.

21. The embossed facial tissue of claim 18 wherein the standard deviation is about 1 or less.

22. An embossed tissue substantially as shown in FIG. 1, wherein the embossing is provided by an embossing roll having a seamless simulated Penrose embossing pattern.

23. An embossed tissue substantially as shown in FIG. 2, wherein the embossing is provided by an embossing roll having a seamless simulated Penrose embossing pattern.

* * * * *